United States Patent
Zuñiga Sagredo (10) Patent No.: US 8,276,848 B2
(45) Date of Patent: Oct. 2, 2012

(54) RIB STRUCTURE FOR TORSION BOXES OF A WING OR HORIZONTAL STABILISER OF AN AIRCRAFT

(75) Inventor: Juan Zuñiga Sagredo, Madrid (ES)

(73) Assignee: Airbus Operations, S.L., Getafe (Madrid) (ES)

( * ) Notice: Subject to any disclaimer, the term of this patent is extended or adjusted under 35 U.S.C. 154(b) by 1013 days.

(21) Appl. No.: 12/044,419

(22) Filed: Mar. 7, 2008

(65) Prior Publication Data
US 2008/0283675 A1   Nov. 20, 2008

(30) Foreign Application Priority Data
Apr. 30, 2007  (ES) .................................. 200701256

(51) Int. Cl.
  *B64C 1/00*  (2006.01)
  *B64C 3/00*  (2006.01)
  *B64C 5/00*  (2006.01)

(52) U.S. Cl. ............... 244/123.8; 244/123.1; 244/123.7; 244/132

(58) Field of Classification Search ............... 244/123.4, 244/123.7, 123.8, 123.2, 123.3, 131, 123.1, 244/124, 132
See application file for complete search history.

(56) References Cited

U.S. PATENT DOCUMENTS

| | | | | |
|---|---|---|---|---|
| 2,135,464 A * | 11/1938 | De Seversky | ............ | 244/123.12 |
| 2,275,038 A * | 3/1942 | Whitesell, Jr. et al. | .. | 244/123.12 |
| 2,367,750 A * | 1/1945 | Berkow et al. | ............. | 244/123.2 |
| 2,382,950 A * | 8/1945 | Watter | ........................ | 244/123.2 |
| 2,483,134 A * | 9/1949 | Gitz et al. | ................... | 244/123.8 |
| 6,386,481 B1 | 5/2002 | Kallinen | | |
| 2001/0051251 A1 | 12/2001 | Noda et al. | | |
| 2004/0035981 A1 | 2/2004 | Nunn, Jr. et al. | | |

* cited by examiner

*Primary Examiner* — Philip J Bonzell (74) *Attorney, Agent, or Firm* — Wenderoth, Lind & Ponack, L.L.P.

(57) ABSTRACT

Rib structure for a torsion box of an aircraft wing or a horizontal stabilizer. The structure comprises a center element which extends between the front spar and the rear spar of the torsion box, a series of vertical stiffening elements arranged between an upper skin and a lower skin of the torsion box. The vertical stiffening element consists of a first lateral wing which extends in the direction of said front spar and a second lateral wing which extends in the direction of said rear spar. These lateral extensions emerge from respective opposite sides of the vertical body and are attached side to side to the center element of the rib.

30 Claims, 6 Drawing Sheets

RIB STRUCTURE FOR TORSION BOXES OF A WING OR HORIZONTAL STABILISER OF AN AIRCRAFT

TECHNICAL FIELD OF THE INVENTION

The present invention belongs to the field of the technology of aeronautics and in particular to the sector of torsion boxes forming part of aircraft stabilisers and wings.

PRIOR ART OF THE INVENTION

The wings and stabilisers of aircraft usually contain torsion boxes. The structure of a torsion box comprises a front spar (in the direction of flight), a rear spar (in the direction of flight), ribs which extend between the front and rear spar, and a series of vertical stiffening elements arranged between an upper skin and a lower skin. Inside the box are to be found stringers spaced between each other which extend perpendicularly to the ribs, along with stiffening elements arranged between the upper and lower skin. Each stringer is joined by its base to one of the skins. Each rib comprises a center element which is a flat element that defines the actual plane of the rib. This element constitutes the attachment of the rib to the spars and provides support for the vertical and horizontal stiffeners. The center element is not attached to the skins directly.

The ribs are typical structural elements of torsion boxes of wings and stabilisers, and the main function of the ribs in the box is to maintain the geometric section of it when withstanding loads and suffering deformations, and, moreover, in the case of load-bearing surfaces, to transmit the loads acting on the skin (concentrated or distributed) to the spars.

In recent years, the use of composite materials in load-bearing surfaces has grown rapidly in the manufacture of aeronautical pieces on account of the advantages of lightness provided by their use. Nevertheless, the conventional concepts of ribs do not completely solve all the aspects of classical metallic construction ribs. This means that the potential for weight reduction that is expected from the improved properties of the material is not being fully exploited. So, there exist numerous conventional structural designs for torsion boxes, a typical example being the presence of a hybrid rib (carbon fibre center element, metal formers) within a metallic torsion box with skins and spars of aluminum. In that conventional design, the attachment of the rib to the skin is done by means of formers (metal elements with an angular shape) with the consequent penalisation in terms of weight and cost, requiring the manufacture and assembly of these additional pieces. Their presence implies that riveting needs are doubled since one goes from a single line of rivets that are needed in metallic ribs (skin-rib) to two rivets (skin-former and former-rib). These formers have to be metallic since carbon fibre is not capable of transmitting the high loads by the folds. So, the ribs, which could potentially be made of carbon fibre, become hybrid (aluminum-carbon), thereby reducing the benefit provided by the use of carbon fibre. Likewise, in this conventional design, the transmission of vertical loads from the skins towards the vertical stiffeners is not direct which means that, when the load path is lengthened, structural resistance has to be given to a larger portion of the rib and this is made more flexible, lessening its resistance to sagging. In this regard, it has to be borne in mind that the vertical stiffeners have to support a considerable mechanical load arriving from the skins. Nevertheless, this load does not reach them directly but instead by the formers and center element and are introduced eccentrically.

In view of the foregoing, the state of the art has suffered from the problems of the need to have to use formers and the difficulty of achieving a correct transmission of the vertical loads to the vertical stiffeners.

DESCRIPTION OF THE INVENTION

The aim of the present invention is to solve the problems described above by means of a novel rib structure for a torsion box for an aircraft wing or stabiliser, and by means of a novel vertical stiffening element for that rib structure.

The rib structure of the present invention comprises, in a manner that is itself conventional, a center element which extends between the front spar and the rear spar of the torsion box, a series of vertical stiffening elements arranged between an upper skin and a lower skin of the torsion box, each vertical stiffening element comprising a vertical body, an upper end part and a lower end part, and upper and lower stringers respectively attached internally to the upper and lower skin and arranged in a direction substantially perpendicular to the center element of the rib, with each stringer presenting a base with which it is attached to the corresponding skin, in said rib structure. The vertical stiffening element consists of a first lateral wing which extends in the direction of said front spar and a second lateral wing which extends in the direction of said rear spar. These lateral extensions emerge from respective opposite sides of the vertical body and are attached side to side to the center element of the rib.

In accordance with the invention, at least one of the ends of each vertical stiffening element is attached directly to a stringer, in such a way that an attachment is produced of at least one of the skins to the center element of the rib by the stiffening element.

The rib structure of the present invention makes it possible to fully exploit the weight saving provided by the use of carbon fibre in view of the fact that the use of angular type metallic parts such as the formers described above is not required. Moreover, the rib is attached directly to the skin without the need for folds in the material (necessary in view of the fact that carbon fibre cannot support such folds when the loads are high). Therefore, the present invention permits more efficient structural designs to be obtained and the assembly processes of the structures to be simplified. The horizontal stiffening elements of the present invention are easily manufactured, for example, by planning standard preforms, using gluing processes in their assembly that are conventional in themselves and compatible with other types of alternative or complementary attachments if necessary, for example, riveting. Finally, the implementation of the present invention has the advantage of not implying a radical change in the way the ribs are manufactured, and it can be easily introduced into existing designs, making them more efficient.

In an embodiment of the invention, the body of the vertical stiffening element has a vertical extension that is greater than its second lateral wing. According to this design, the upper end of the vertical stiffening element projects beyond the upper edge of the center element of the rib and/or the lower end of the vertical stiffening element projects beyond the lower edge of the center element of the rib. In this way, the end parts of the vertical stiffening elements can be attached to an axial rib emerging from its base to the inside of the torsion box. In this embodiment, the end part of each vertical stiffening element is preferably attached frontally to said axial rib, "frontally" being understood as the side of said rib that is on the same side as the front spar.

In those ribs in which the upper and lower spar coincide in the same vertical plane, each vertical stiffening element can be attached by its upper end part to the upper stringer and by its lower end part to the lower stringer. Moreover, and especially when the upper and lower stringers do not coincide in the same vertical plane, the vertical stiffening elements can be attached by just one of their ends, in other words, by their upper ends or by their lower ends, to the upper or lower stringer, respectively, while their opposite end remains attached side to side to the center element of the rib. The first lateral wing of the vertical stiffening element can have a vertical length greater than the vertical length of the second lateral wing of the vertical stiffening element, thereby providing greater rigidity to the vertical body.

Likewise, the first lateral wing of at least one of the vertical stiffening elements can, on the basis of a greater vertical extension length, have a larger width than the width of the second lateral wing of the vertical stiffening element, which increases the strength of the attachment of the vertical stiffening element to the rib, in addition to conferring the capacity to transfer shear load from the stringer of the skin to the center element of the rib.

In another embodiment of the invention, the end part of each vertical stiffening element attached to a stringer runs up against the base of the corresponding stringer. In this embodiment, each of these vertical stiffening elements acting as a stop preferably also includes, in its end part attached to the stringer, a support plate attached to the base of the stringer. This support plate is extended horizontally between the body of the vertical stiffening element and the first lateral wing of the vertical stiffening element in such manner that the support plate is attached side to side to said base of the axial rib of the stringer. The skin, the stringer and the support plate can be riveted and/or glued together. Likewise, and in accordance with the invention, the end parts of the vertical stiffening elements can be attached to the stringers by means of gluing and/or riveting, while the bodies of the vertical stiffening elements can also be attached to the center element of the rib by means of riveting and/or gluing. The simultaneous attachment of the vertical stiffening elements both to the rib and to the base of the stringer, as well as to the skin, enormously increases the capacity of the attachment for load transfer and is especially suitable for ribs which have to support the introduction of high loads. This is also an advantage when the stringer is not capable of transferring high loads in the vertical direction.

According to what is revealed from the above description of the rib structure of the present invention, the vertical stiffening element, which preferably has a cross-section in the form of a T, is distinguished in that at least one of the end parts of its vertical body is suitable for being attached directly to a stringer. In order to adapt itself to the various possibilities of embodiment of this rib structure of the present invention, at least one or both of the lateral wings of the vertical stiffening element can have a vertical extension shorter than the vertical body in such manner than one or both of its end parts project vertically beyond each lateral wing which has a shorter vertical extension length. According to this embodiment, the upper end part of the vertical body can project upwards beyond each lateral wing which has that shorter vertical extension, and/or the lower end part of the vertical body can project downwards below each lateral wing which has the said shorter vertical extension. In turn, the first lateral wing of the vertical stiffening element can have a greater width than the width of its second lateral wing. The vertical stiffening element can also include, in one of both of its end parts attachable to a stringer, a support plate which is extended horizontally between the body of the vertical stiffening element and the first lateral wing of the vertical stiffening element.

Although the present invention is especially intended for ribs manufactured with composite materials, the structural concept is also applicable to metallic ribs. Moreover, the present invention is compatible with the application of elements permitting the necessary manufacturing and assembly tolerance to be overcome (supplements), and it can furthermore serve as support for the installation of systems. This latter is a typical functional requisite of torsion box ribs, especially when the torsion box also acts as a fuel tank.

BRIEF DESCRIPTION OF THE DRAWINGS

Explained below are aspects of the invention on the basis of some attached drawings in which.

Figure 1:
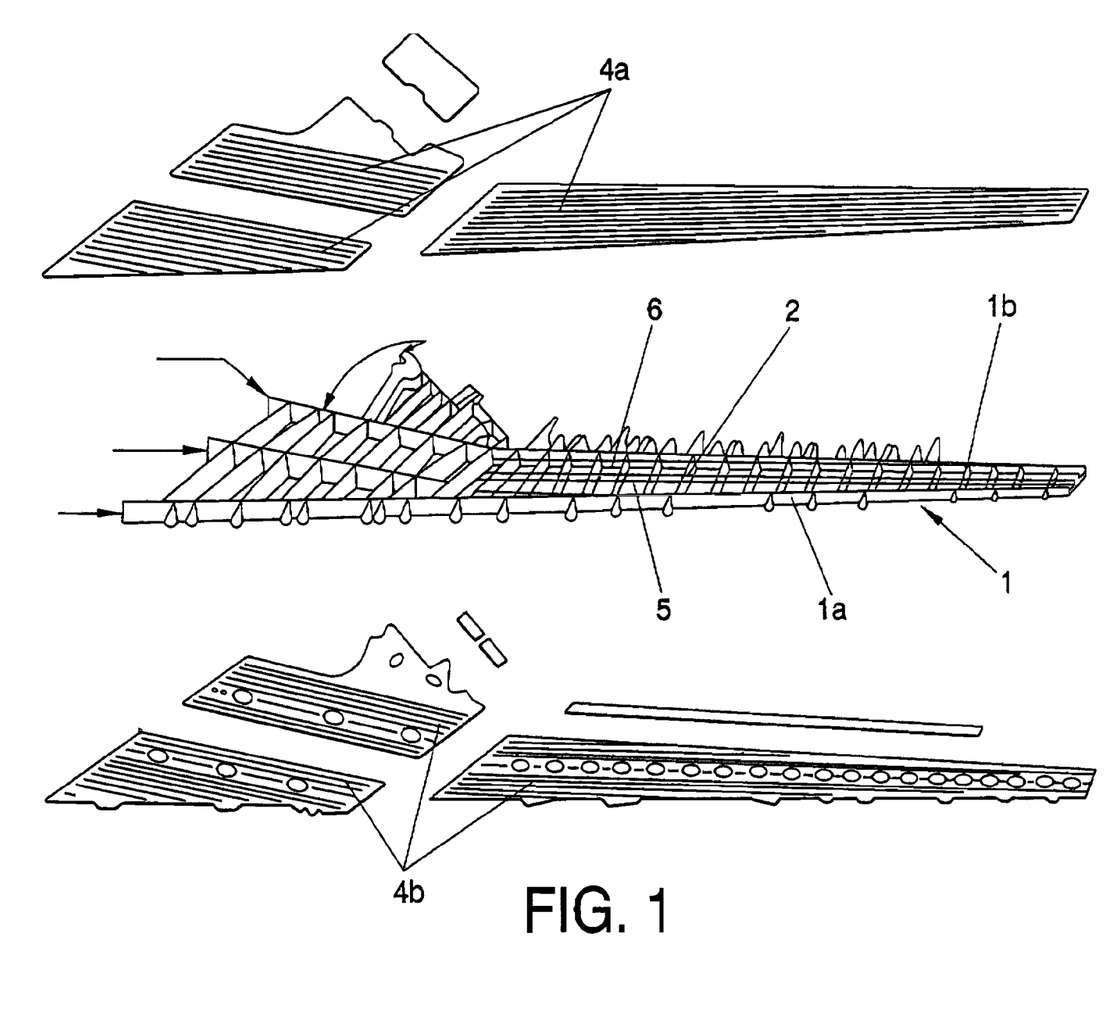
FIG. 1 is a schematic exploded view in upper front perspective of an aircraft wing.
Figure 2:
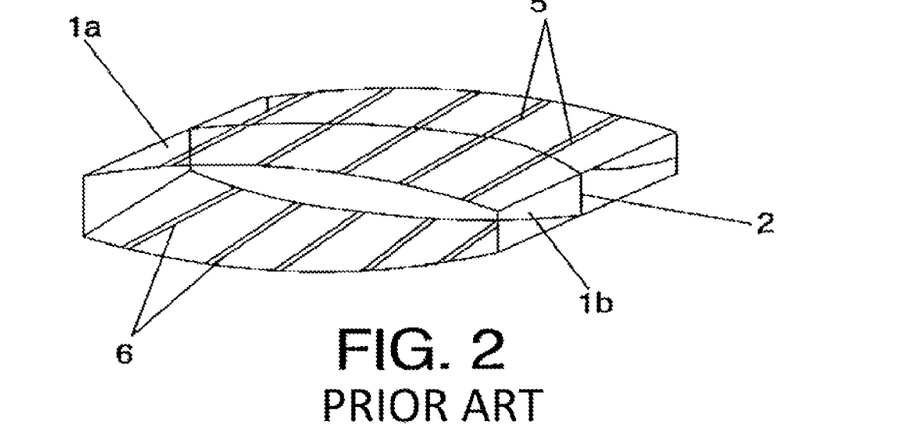
FIG. 2 is a sectioned schematic view in perspective of part of the conventional torsion box.

Appearing in these figures are reference numbers having the following meanings:
1 torsion box
1a front spar
1b rear spar
2 center element of the rib
3 vertical stiffening elements
3a vertical body
3b upper end part
3c lower end part
3d first lateral wing
3e second lateral wing
3f support plate
4a upper skin
4b lower skin
5 upper stringers
5a base of the upper stringer
5b axial rib of the upper stringer
6 lower stringers
6a base of the lower stringer
6b axial rib of the lower stringer
7a upper former
7b lower former
8 horizontal stiffener
9 vertical stiffener Embodiments of the Invention The present invention is applicable to a torsion box 1 of the type that is shown schematically in FIGS. 1 and 2, and which comprises a front spar 1a and a rear spar 1b, between which there extends a series of ribs with center elements 2 in the form of flat plates. As shown in FIGS. 1 and 2, the center element 2 joins with both of the front spar 1a and rear spar 1b. Perpendicular to the ribs and attached respectively to the upper 4a and lower 4b skin is a series of upper 5 and lower 6 stringers.

Figure 3:
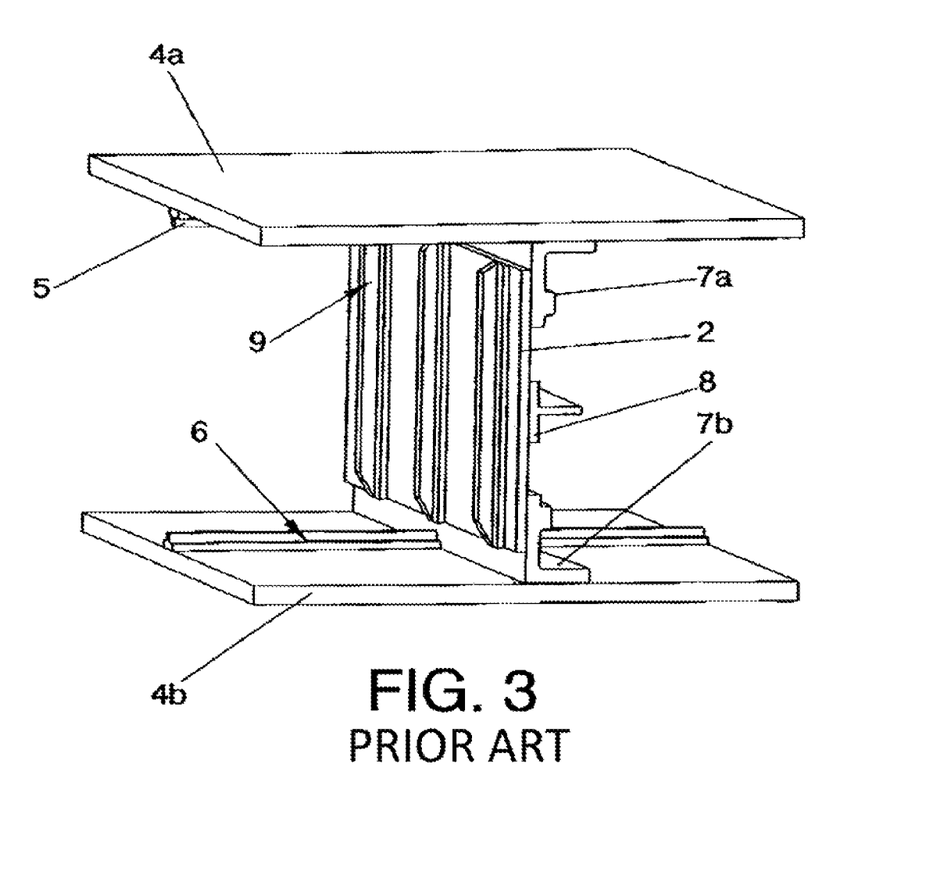
FIG. 3 is a partial schematic view in cross-section in rear perspective of a torsion box with a rib of the state of the art.

FIG. 3 is a partial view of a torsion box with a conventional rib structure, comprising a front spar 1a, a rear spar (1b), a rib center element 2 which extends between and joins with the front spar 1a and the rear spar 1b, and a series of vertical stiffening elements 9 arranged between the upper skin 4a and the lower skin 4b. Inside the torsion box are to be found some upper stringers 5 attached to the internal face of the upper skin 5 and some lower stringers attached to the lower skin. The stringers 5, 6 are spaced between each other and extend perpendicularly to the ribs, and each stringer 5, 6 is attached by its base to one of the skins 4a, 4b. The center element of the rib constitutes the attachment of the rib to the spars 1a, 1b and provides support for the vertical stiffeners 9 and the horizontal stiffeners 8 which are attached to opposite faces of said center element 2. It can be seen that the center element 2 is not attached to the skins 4a, 4b directly but instead by means of formers 7a, 7b consisting of metallic elements with the shape of an angular profile respectively attached to the upper skin 4a, 4b.

Figure 4:
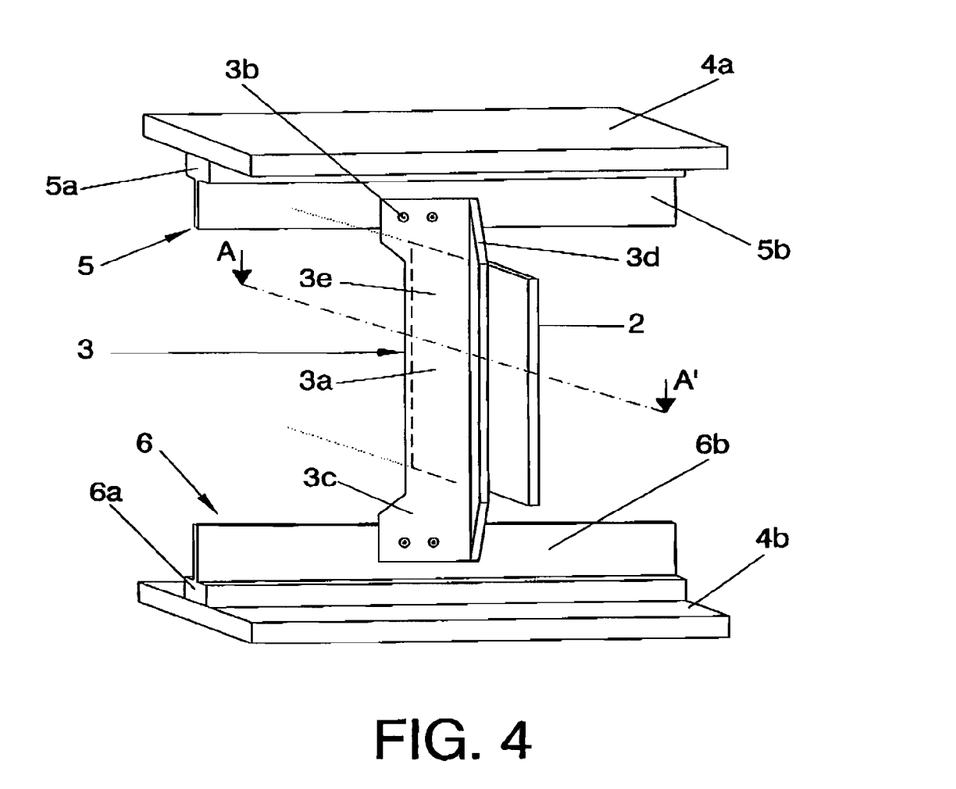
FIG. 4 is a partial schematic view in cross-section in front perspective of a torsion box with a rib according to an embodiment of the present invention.
Figure 5:
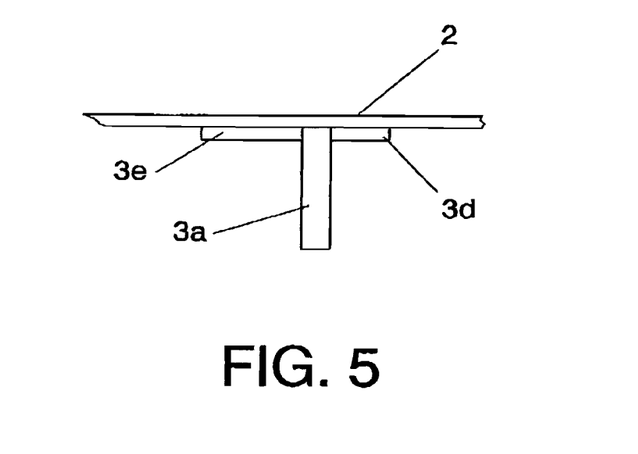
FIG. 5 is a partial schematic view in transverse cross-section along the line A-A' of the torsion box shown in FIG. 4.
Figure 6:
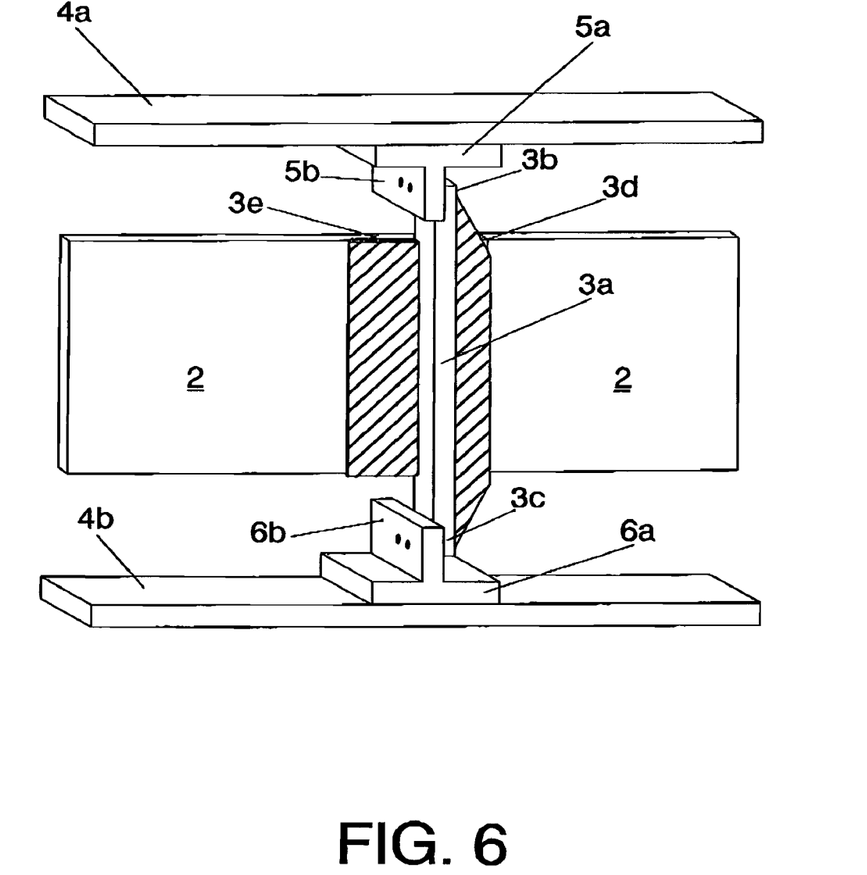
FIG. 6 is a partial schematic view in lateral cross-section in perspective of the torsion box shown in FIG. 4.

FIGS. 4 to 6 show a first embodiment of the present invention in which the vertical stiffening element 3 comprises a vertical body 3a (which, as shown in FIGS. 4 and 5, is constituted by a vertically extending planar plate), an upper end part 3b and a lower end part 3c, a first lateral wing 3d which extends in the direction of said front spar 1a from the vertically extending planar plate 3a and a second lateral wing 3e which extends in the direction of said rear spar 1b from the vertically extending planar plate 3a. The lateral wings 3d, 3e of respective opposite sides of the vertical body 3a of the vertical stiffening element are attached side to side to the center element 2 of the rib. The upper end 3 and the lower end 3c of the vertical stiffening element 3 are respectively attached by riveting to an axial rib 5b which projects from the base 5a of an upper stringer 5 and to an axial rib 6b which projects from the base 6a of a lower stringer 6, in such manner that each of those skins 4a, 4b is attached to the center element 2 of the rib by the stiffening element 3. It can furthermore be appreciated that the first lateral wing 3d has a greater vertical extension than the second lateral wing 3e, in such a way that the transverse section of the vertical stiffening element 3 is that of an unequal T. Moreover, it can be seen that the vertical body 3a has a greater extension than the lateral wings 3d, 3e in such a way that the upper 3b and lower 3c ends project beyond the upper and lower edges of the lateral wings 3d, 3e.

Figure 7:
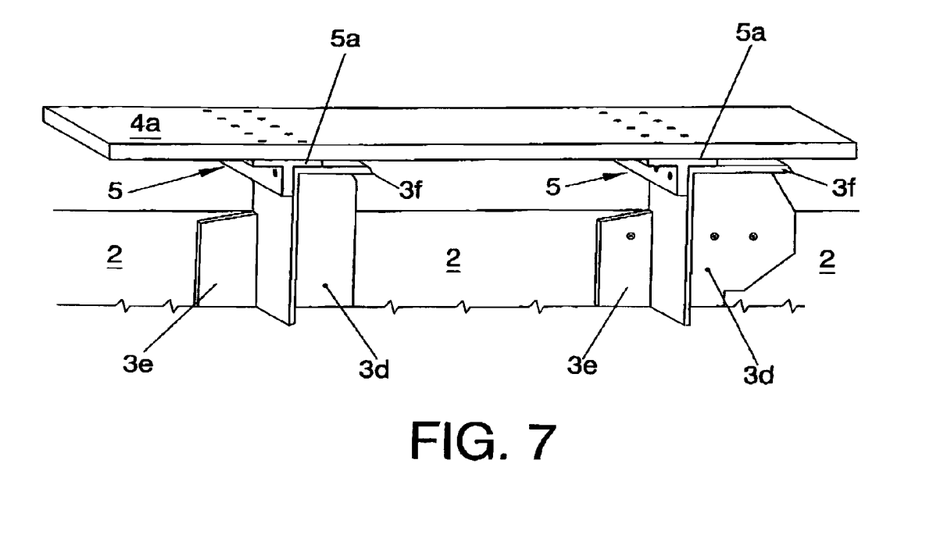
FIG. 7 is a partial schematic view in lateral cross-section in perspective of a second embodiment of the rib of the present invention.

In the embodiment of the rib structure shown in FIG. 7, the first lateral wings 3d have a vertical extension and width greater than the second lateral wings 3e. Likewise, in this embodiment the vertical bodies 3a present in their upper ends individual support plates 3f which make contact with the bases 5a of the respective stringers 5 to which they are attached.

Figure 8:
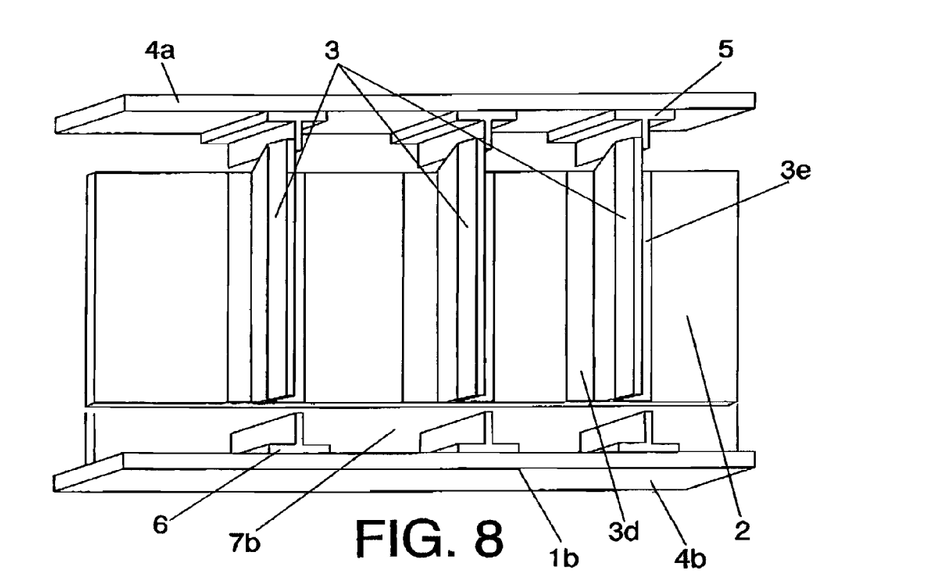
FIG. 8 is a partial schematic view in lateral cross-section in perspective of a third embodiment of the rib of the present invention.

In the embodiment of the rib structure shown in FIG. 8, the stiffening elements are attached by just their upper ends to the upper stringer 5 while by their opposite end they are attached side to side to the center element 2 of the rib.

Figure 9:
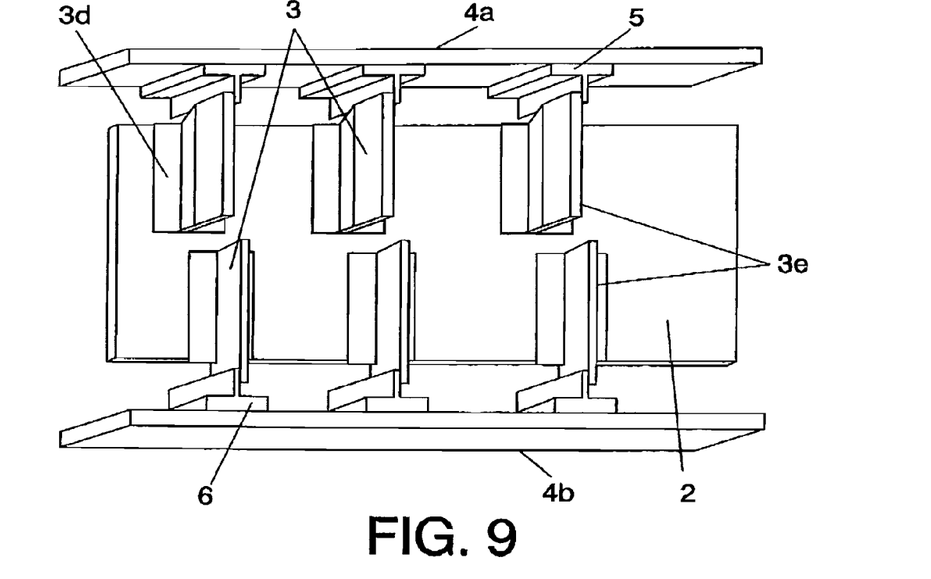
FIG. 9 is a partial schematic view in lateral cross-section in perspective of a fourth embodiment of the rib of the present invention.

Finally, in the embodiment of the rib structure shown in FIG. 9 which is especially applicable when the upper stringers 5 provided in the upper skin 4a are in positions that are out of phase with respect to the lower stringers 6 provided in the upper skin, provision is made for certain upper vertical stiffening elements 3 whose upper ends are attached to the respective upper stringers 5 and certain lower vertical stiffening elements 3 whose lower ends are attached to the respective lower stringers 6.

In view of the foregoing, it is apparent that this present invention is easily implementable without any substantial structural changes being necessary in the torsion boxes.

The invention claimed is:

1. A rib structure for a torsion box of an aircraft wing or a horizontal stabiliser which comprises a front spar (1a) and a rear spar (1b), the rib structure comprising:
   a center element (2) which extends between the front spar (1a) and the rear spar (1b);
   a plurality of vertical stiffening elements (3) arranged between an upper skin (4a) and a lower skin (4b) and joined to the center element (2) of the rib; each vertical stiffening element (3) comprising a vertical body (3a) with an upper end part (3b) and a lower end part (3c), a first lateral wing (3d) which extends in the direction of said front spar (1a) and a second lateral wing (3e) which extends in the direction of said rear spar (1b); said lateral wings (3d, 3e) emerging from respective opposite sides of the vertical body (3a) and being attached to the center element (2) of the rib;
   upper stringers (5) and lower stringers (6) respectively attached internally to the upper skin (4a) and lower skin (4b), and arranged in a direction substantially perpendicular to the center element (2) of the rib, each stringer (5, 6) comprising a base (5a, 6a) with which it is joined to the respective skin (4a, 4b);
   wherein at least one of the end parts (3b, 3c) of each of the vertical stiffening elements (3) is joined directly to one of the stringers (5, 6); and
   wherein at least one of the skins (4a, 4b) is attached to the center element (2) by the stiffening elements (3).

2. The rib structure according to claim 1, wherein the body (3a) of each of the vertical stiffening elements (3) has a vertical extension greater than that of at least its second lateral wing (3d).

3. The rib structure according to claim 1, wherein each of the vertical stiffening elements (3) is joined by its upper end part (3b) to one of the upper stringers (5) and by its lower end part (3c) to one of the lower stringers (6).

4. The rib structure according to claim 1, wherein the vertical body of at least one vertical stiffening element (3) is attached via its upper end part (3b) to an upper stringer (5) and in that its lower end part (3c) is not attached to a lower stringer (6).

5. The rib structure according to claim 1, wherein the vertical body (3a) of at least one of the vertical stiffening elements (3) is attached via its upper end part (3b) to one of the upper stringers (5), and wherein its lower end part (3c) is not attached to one of the lower stringers (6).

6. The rib structure according to claim 1, wherein the first lateral wing (3d) of each of the vertical stiffening elements (3) has a vertical extension greater than the vertical extension of the second lateral wing (3e) thereof.

7. The rib structure according to claim 1, wherein the first lateral wing (3d) of at least one of the vertical stiffening elements (3) has a horizontal extension greater than the width of the second lateral wing (3e) thereof.

8. The rib structure according to claim 1, wherein each end part (3b, 3c) of each of the vertical stiffening elements (3) attached to one of the stringers (5, 6) is attached to said stringer (5, 6) by glue.

9. The rib structure according to claim 1, wherein the lateral wings (3d, 3e) of each of the vertical stiffening elements (3) are attached to the center element (2) by rivets.

10. The rib structure according to claim 1, wherein the lateral wings (3d, 3e) of each of the vertical stiffening stringers (3) are attached to the center element (2) by glue.

11. The rib structure according to claim 1, wherein each the vertical stiffening elements (3) has a T cross-section.

12. The vertical stiffening element according to claim 1, wherein the center element (2) joins with both the front spar (1a) and the rear spar (1b).

13. The vertical stiffening element according to claim 1, wherein said vertical body (3a) of each of said vertical stiffening elements (3) is constituted by a vertically extending planar plate from which each of said lateral wings (3d, 3e) extends.

14. The rib structure according to claim 1, wherein each of the stringers (5, 6) to which one of the end parts (3b, 3c) of one of the vertical stiffening elements (3) is attached comprises an axial portion (5b, 6b) which emerges from its base (5a, 6a) towards the inner part of the torsion box, and the vertical stiffening elements (3) are attached to said axial portion (5b, 6b).

15. The rib structure according to claim 14, wherein the end part (3b, 3c) of each of the vertical stiffening elements (3) attached to one of the stringers (5, 6) is frontally attached to said axial portion (5b, 6b) thereof.

16. The rib structure according to claim 1, wherein the end part (3b, 3c) of each of the vertical stiffening elements (3) attached to one of the stringers (5, 6) runs up against the base (5a, 6a) of the stringer (5, 6).

17. The rib structure according to claim 16, wherein the vertical stiffening elements (3) comprises, in its end part (3b, 3c) attached to the stringer, a support plate (3f) attached to said base (5a, 6a) of the stringer (5, 6) and in that said support plate (3f) extends horizontally between the body (3a) of the vertical stiffening element (3) and the first lateral wing (3d) of the vertical stiffening element (3), in such a way that the support plate (3f) remains attached side to side to said base (5a, 6a) of the axial portion (5b, 6b) of the stringer (5, 6).

18. The rib structure according to claim 17, wherein the skin (1a, 1b), the stringer (5, 6) and the support plate (3f) are riveted together.

19. The rib structure according to claim 17, wherein the skin (1a, 1b), the stringer (5, 6) and the support plate (3f) are glued together.

20. A rib structure for a torsion box, where the rib structure comprises a front spar (1a), a rear spar (1b), a single center element (2) which fully extends between the front spar (1a) and the rear spar (1b), upper stringers (5) and lower stringers (6) respectively attached internally to an upper skin (4a) and to a lower skin (4b), and arranged in a direction substantially perpendicular to the center element (2) of the rib, each of the stringers (5, 6) presenting a base (5a, 6a) with which it is attached to the corresponding skin (4a, 4b);

and where a vertical stiffening element (3) comprises a vertical body (3a) attached to the center element (2) of the rib, an upper end part (3b) and a lower end part (3c), a first lateral wing (3d) which extends in the direction of the front spar (1a) of the torsion box and a second lateral wing (3e) which extends in the direction of the rear spar (1b) of the torsion box, said lateral wings (3d, 3e) emerging from respective opposite sides of the vertical body (3a);

wherein at least one of the end parts (3b, 3c) of the vertical body (3a) of the vertical stiffening element (3) is attached directly to one of the stringers (5, 6).

21. The rib structure according to claim 20, wherein the first lateral wing (3d) of the vertical stiffening element (3) has a horizontal extension greater than the horizontal extension of the second lateral wing (3e) of the vertical stiffening element (3).

22. The rib structure according to claim 20, wherein the vertical stiffening element (3) comprises, in at least one of its end parts (3b, 3c) attachable to one of the stringers (5), a support plate (3f) which extends horizontally between the vertical body (3a) of the vertical stiffening element (3) and the first lateral wing (3d) of the vertical stiffening element (3).

23. The rib structure according to claim 20, wherein the center element (2) joins with both the front spar (1a) and the rear spar (1b).

24. The rib structure according to claim 20, wherein said vertical body (3a) of each of said vertical stiffening elements (3) is constituted by a vertically extending planar plate from which each of said lateral wings (3d, 3e) extends.

25. The rib structure according to claim 20, wherein at least one of the lateral wings (3d, 3e) has a shorter vertical extension than the vertical extension of the vertical body (3a), in such a way that at least one of its end parts (3b, 3c) projects vertically beyond the lateral wing (3e) which has said shorter vertical extension.

26. The rib structure according to claim 25, wherein the upper end part (3b) of the vertical body (3a) projects upwards beyond the lateral wing (3e) which has said shorter vertical extension.

27. The rib structure according to claim 25, wherein the lower end part (3c) of the vertical body (3a) projects downwards beyond the lateral wing (3e) which has said shorter vertical extension.

28. The rib structure according to claim 25, wherein both lateral wings (3d, 3e) have vertical extensions shorter than the vertical body (3a).

29. The rib structure according to claim 20, wherein said vertical stiffening element has a T cross-section.

30. The rib structure according to claim 29, wherein said vertical stiffening element has a T cross-section with unequal legs.

\* \* \* \* \*